Patented May 11, 1926.

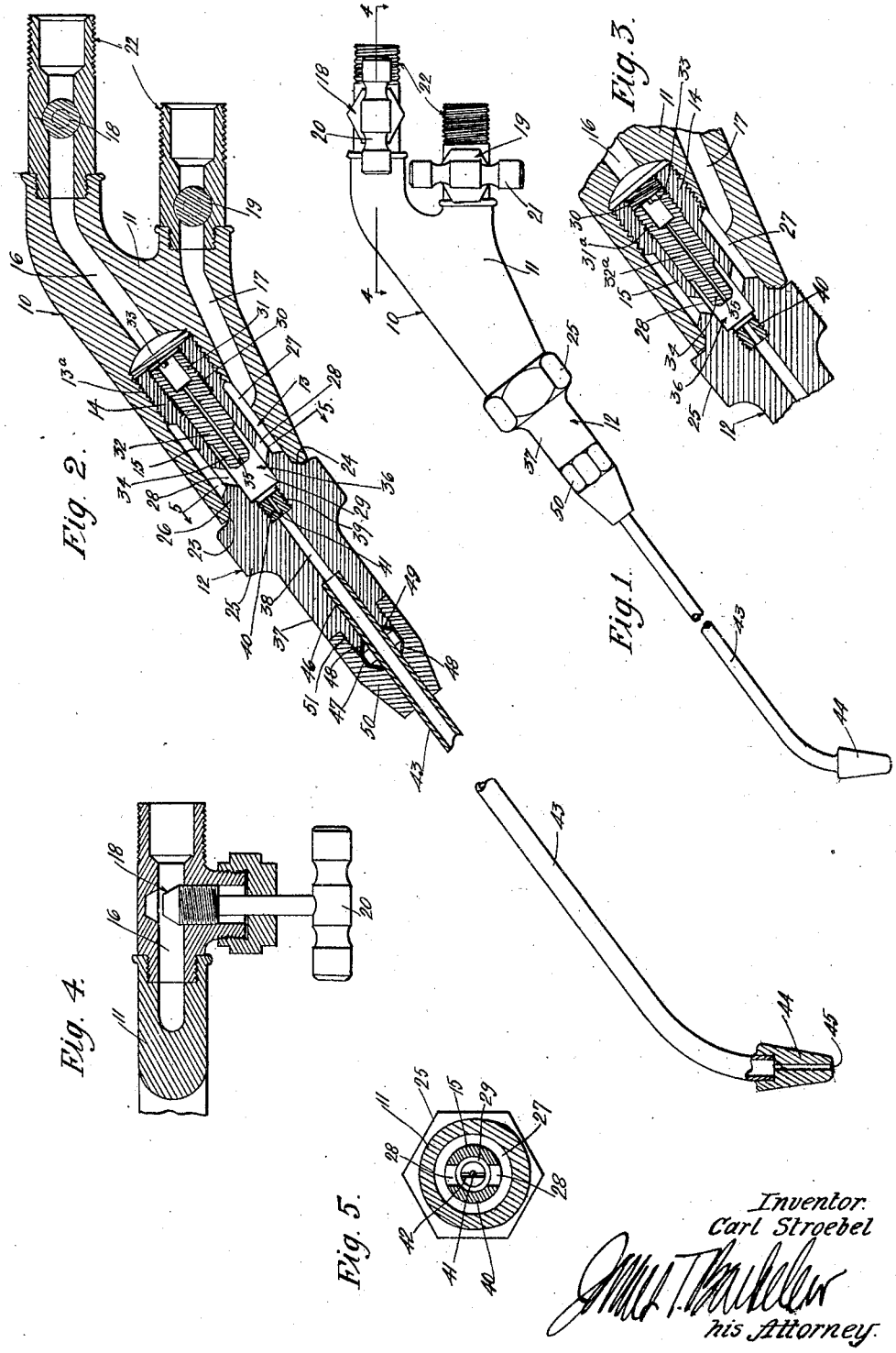

1,584,199

UNITED STATES PATENT OFFICE.

CARL STROEBEL, OF LOS ANGELES, CALIFORNIA.

WELDING TORCH.

Application filed April 12, 1924. Serial No. 706,038.

This invention relates generally to torches such as are used in the welding and flame cutting of metal, lead burning, etc.

While the invention, in certain of its aspects, may be applied with advantage to torches which utilize various combinations of gases for combustion, it is particularly well adapted to so called "oxy-acetylene welding torches" wherein approximately equal volumes of oxygen and acetylene are mixed and burned to produce a welding flame. Therefore I will confine this description to a torch of this particular character, but it is to be understood that this confinement is not to be construed as in any way limiting the invention to such restricted application.

It is among the objects of the invention to produce a torch which is compact, easily welded, and capable of being applied to work which is practically inaccessible to usual torches. To this end, I have arranged the gas mixing chamber in the torch handle, whereby the mixed gases may be led to the tip by means of a single, slender tube, this tube being of flexible metal whereby it may be bent at the will of the operator to conform with small or tortuous passageways through which the tube must sometimes be inserted to reach the work or point of weld. This feature is of especial advantage in connection with the welding of boiler tubes or wherever work is to done within pipes of relatively small diameter, for it enables the operator to so bend the tube that the tip is disposed angularly at any desired degree with respect to the tube thus shaping the tool to suit the peculiarities of the work in hand. For instance, the operator may get around or back of obstructions which extend into pipe bores.

I am aware that it is old in the art to provide a single tube from mixing chamber to tip, but so far as I know, such torches as have incorporated this feature do not have flexible tubes, nor have they the features of a small compact handle which comfortably fits the operator's hand, this by reason of their mixing valve structure in the handle being of a nature to enforce the use of a relatively large, bulky hand grip.

There are two types of weldiing torches in general use, namely, the "injection type" and "equal pressure type". In the injection type, oxygen under high pressure flows rapidly through the mixer, and in passing inlet ports which communicate with the supply of acetylene, draws in acetylene at a higher velocity than would be imparted to it by reason of its original pressure alone. Such torches are used where acetylene is supplied by low pressure generators, the injector of the torch acting, in effect, as a booster for the acetylene.

"Equal pressure" torches are used where acetylene is supplied under comparatively high pressure, for instance when stored in tanks or cylinders. so the oxygen and acetylene may be supplied to the torch in correct ratio without depending upon means other than the tank pressure for passing the acetylene to the mixer. "Equal pressure" is really inaccurate as a torch classification for it is merely an indication that the gage pressures at the supply tanks are equal, and it does not necessarily follow that the gas pressures at the work are equal; for, after the gases reach the torch, their pressures depend upon the size of duct openings, etc., in the torch. Therefore, torches which do not depend upon the injection principles, but through which the acetlylene flows only under its own pressure, may be more properly classified as "positive-pressure" torches, and I will hereinafter so classify them.

I have so designed my torch that it may be used either as one of the injector type or as a positive pressure type, thus enabling the operator to carry a single torch which may be adapted for use where acetylene is supplied under either high or low pressure.

It is highly important that the torch so mix and pass the gas that a "neutral flame" be maintained at the tip. A neutral flame consumes, and therefore must be supplied with, equal volumes of acetylene in contradistinction to the supply and consumption of a mixture having a preponderance of either gas, which latter condition produces either an oxidizing or carbonizing flame. I have provided adjustment means within the torch whereby the correct gas ratio may be procured and maintained irrespective of the comparative pressure at which the acetylene is supplied The construction of my torch is such that the gases are properly mixed to prevent the annoying and sometimes dangerous occurrence of "flash-backs".

Other features of novelty and objects of the invention will be set forth in the following specification, reference being had to the accompanying drawings, in which—

Figure 1 is a contracted side elevation of my improved torch.

Fig. 2 is an enlarged medial section through the torch showing the mixer adjusted to act under positive pressure of two gases.

Fig. 3 is a fragmentary sectional view of the mixer but showing the parts adjusted to transform the torch into one of the injection type.

Fig. 4 is an enlarged horizontal section on line 4—4 of Figure 1; and

Fig. 5 is a transverse section on line 5—5 of Figure 2.

In the drawings, I have shown a mixer 10 made up of a body or handle member 11 and a nozzle supporting member 12. The handle member is externally shaped to comfortably fit the operator's hand, and at its forward end is provided with a relatively large bore 13 which threadedly receives at 13$^a$ a head 14 provided on the end of tubular extension 15 of member 12. Member 11 also has the two relatively small bores 16 and 17, the first opening into the end of bore 13 and the last opening into the side thereof.

Valves 18 and 19, manipulated by handles 20 and 21, respectively, are adapted to control the flow of gases through bores 16 and 17, respectively, these gases being led to the valves from sources of supply through suitable tubes (not shown) which attach to the valves at 22. For the purpose of more clearly and definitely specifying the gas flow and mixture, it will hereinafter be assumed that oxygen is to be admitted through valve 18 and acetylene through valve 19, but it will be understood the torch is capable of functioning properly with other combinations of gases.

Members 11 and 12 are separable due to their screw connection 13$^a$, but when assembled they are drawn together with sufficient tightness to seat the counter-sunk end 23 of member 11 on the chamfered shoulder 24 of member 12, the latter member having a tool grip or nut portion 25, and extremity 15 having a portion 26 of relatively large diameter to snugly fit bore 13 and thus act as a spacer and guide between members 11 and 12 at their points of junction. Thus a gas tight joint is provided between the handle and nozzle supporting members.

An annular chamber 27 is formed between member 11 and the reduced portion of extension 15, the chamber being longitudinally defined by head 14 and spacer 26 (or by the longitudinally spaced, opposed annular shoulders provided by the ends of said head and spacer), bore 17 opening into the side of said chamber, as clearly shown in Figures 2 and 3. Ports 28 in extension 15 allow communication between chamber 27 and extension bore 29. The peripheral face of bore 29 is threaded at 30 to receive threaded head 31 of entrance nozzle 32 (Fig. 2) or head 31$^a$ of injector nozzle 32$^a$ (Fig. 3), both nozzles being provided with screw head slots 33 to receive a tool for threadedly adjusting the nozzle when members 11 and 12 are separated.

Nozzles 32 and 32$^a$ are of slightly reduced diameter at their inwardly projecting ends 34, and have axial ducts 35 to allow the passage of oxygen from bore 16 to chamber 36, this chamber being the open or clear portion of bore 29. Chamber 36 serves as a mixing chamber for gases which enter it through duct 35 and ports 28, and when nozzle 32$^a$ is used as an injector, this open portion of bore 29 functions as a suction chamber.

Member 12 has an external extension 37 which is provided with a bore 38, the latter being counter sunk and threaded at 39 to threadably receive mixture nozzle 40, this nozzle having a restricted axial duct 41 and a screw head slot 42. Slot 42 is adapted to receive a screw-driver or similar tool for threadably adjusting or removing the nozzle when members 11, 12 and 32 are separated.

It will be observed that bore 38, duct 41, chamber 36, duct 35 and the major extent of bore 16 are in axial alinement, so oxygen admitted through valve 18 flows in a straight path from handle to nozzle supporter.

The size of the torch flame must vary in accordance with the nature of different tasks in hand, and it is therefore necessary that it be possible to vary the effective diameter of the outlet or tip orifice. This may be accomplished by removably attaching tips of different inside diameters to a single, fixed mixing tube or by providing a plurality of tubes removably attached to the mixer, the several tubes having tips of different inside diameters. I have chosen to illustrate the tips as being fixed to the tubes, and the tubes as being removably attached to the mixer, but this is not to be construed as in any way limiting the invention.

Tube 43, preferably of flexible copper, extends from member 12 to burner tip 44, and while this tube may be attached to said member and tip in a variety of manners, I will describe the preferred method of attachment as illustrated by the drawings. Tip 44, which has a restricted orifice 45, is silver-soldered or brazed to the outer end of the tube, while the inner end of the tube slips into the counter-bore 46 in extension 37. A metal collar 47, having conical ends 48, is slipped over the tube and is adapted to lie between the opposed, conically seated ends 49 of the extension 37 and nut 50. The central portion of collar 47 is annularly spaced from tube 43, and the collar is of such length that it is longitudinally contracted when nut 50 is fully taken up or drawn home on extension threads 51, thus causing the extremities of cones 48 to bite into the tube and provide a gas tight joint between tube 43 and member 12.

Of course, the usual form of rope or washer packing may be substituted for collar 47 without departing from the spirit of the invention, but I find the above described packing to be superior both as regards its durability and its ease of handling when making a tube change.

By reason of the flexibility of tube 43, the operator may bend it to suit various working conditions, thus enabling him to pass the tip around and back of obstructions, point the tip directly at the work when operating through restricted or tortuous passageways, and generally enables the operator to perform many tasks which are inaccessible to and impossible of accomplishment with a rigid tube. This feature of tube flexibility is new to the art, as far as I am aware. The metal tube has sufficient rigidity to maintain it in bent condition until again manipulated by the operator.

With each torch comes a set of tubes having tips of different size orifices, and also a set of nozzles 32 and 40, the nozzles having ducts and orifices of different diameters. When one tube is exchanged for another, members 11 and 12 are separated to allow the operator to remove nozzles 32 and 40 and replace them with others that have ducts of proper diameter to pass the required volume of gas for the particular tip on the substituted tube. In certain instances, tips may be changed without requiring a change of nozzles.

When the torch is to be used with low pressure acetylene, I use a mixture nozzle 40 which has a larger duct than the particular injection nozzle 32ª employed. This is to secure the proper relative flow and mixture of the two gases. Injection nozzle 32ª is screwed into bore 29 until its inner end 34 extends approximately into the position of Figure 3. The high pressure oxygen flows rapidly through the orifice of injector 32ª and into suction chamber 36, drawing with it such acetylene as is flowing through ports 28 from chamber 27. The mixed gases then pass through duct 41 in nozzle 40 and into and through tube 43 where they are further mixed; the mixture finally emerging from tip 44 where it is ignited.

In this way a sufficient volume of acetylene is drawn in by the injector to compensate for the difference in the initial and variable pressure of the two gases, and a neutral flame of proper size may be secured at the tip in spite of such variations in initial pressure. By utilizing injection and mixture nozzles of various relative effective diameters, and by adjusting nozzle 32ª longitudinally through bore 29, the injective effect of the mixer may be varied at the will of the operator to procure a proper mixture at the tip.

When both gases are passed through the torch under positive pressure, that is, when the acetylene is under sufficiently high pressure to insure a neutral flame of sufficient size without being boosted by an injector, I utilize mixture and injection nozzles having equal effective inside diameters, and nozzle 32, which in such a situation serves merely as a gas entrance nozzle, may be backed out to approximately the position shown in Figure 2. The oxygen and acetylene are then initially mixed in chamber 36, when they pass through nozzle 40 and into tube 43 where they are further mixed.

While I have shown and described a preferred embodiment of my invention, I do not wish to be limited thereto except for such limitation as the appended claims may import.

I claim:

1. In a torch of the character described, the combination of a tip supporting member provided with a bore opening to the ends thereof, a tubular nut threaded on one end of the supporting member and having its bore in axial alinement with the supporting member bore, said one end of the tube and said nut having opposed and oppositely inclining conical seats, a tip adapted to be inserted and slipped endwise through the nut and into the bore of the supporting member, and a resilient cylindrical metal collar about and annularly spaced from the tube between said seats and having conical ends adapted to be engaged by said seats when the supporting member and nut are threaded together, the conical ends extending into peripheral engagement with the tube; all in a manner whereby continued threading of the nut on the supporting member is adapted to compress the collar longitudinally between the seats to make a gas tight joint between supporting member and tip.

2. In a torch of the character described, a body member having a bore of two diameters, the bore portion of larger diameter opening to one end of the body member, a tubular tip-supporting member having a tubular stem adapted to be entered in said larger bore portion through said open end, said stem having opposed, longitudinally spaced annular shoulders; the stem, between said shoulders being of lesser diameter than said larger bore portion, and beyond said shoulders being of a diameter to fit said larger bore portion snugly, all in a manner whereby there is an annular chamber in the body member longitudinally defined by said opposed shoulders and peripherally defined by the bore wall of the member and the reduced portion of the stem; the bore of said stem being in communication with the smaller bore portion of the body member whereby gases may be admitted thereto from the exterior of the body member, the supporting member having within it a mixing chamber in communication with its bore, and the stem having ports communicating with said mixing chamber and said annular chamber; said body member having a second bore communicating with and adapted to admit gases from the exterior of the body member to said annular chamber; and a tip carried by said supporting member and with its bore in communication with the supporting member bore.

3. In a torch of the character described, a body member having a bore of two diameters, the bore portion of larger diameter opening to one end of the body member, a tubular tip-supporting member having a tubular stem adapted to be entered in said larger bore portion through said open end, said stem having opposed longitudinally spaced annular shoulders; the stem, between said shoulders being of lesser diameter than said larger bore portion, and beyond said shoulders being of a diameter to fit said larger bore portion snugly, all in a manner whereby there is an annular chamber in the body member longitudinally defined by said opposed shoulders and peripherally defined by the bore wall of the member and the reduced portion of the stem; the bore of said stem being in communication with the smaller bore portion of the body member whereby gases may be admitted thereto from the exterior of the body member, the supporting member having within it a mixing chamber in communication with its bore, and the stem having ports communicating with said mixing chamber and said annular chamber, a pair of nozzles carried by the supporting member and disposed in its bore at opposite sides of the mixing chamber; said body member having a second bore communicating with and adapted to admit gases from the exterior of the body member to said annular chamber; and a tip carried by said supporting member and with its bore in communication with the supporting member bore.

4. In a torch of the character described, a body member having a bore of two diameters, the bore portion of larger diameter opening to one end of the body member, a tubular tip-supporting member having a tubular stem adapted to be entered in said larger bore portion through said open end, said stem having opposed, longitudinally spaced annular shoulders; the stem, between said shoulders being of lesser diameter than said larger bore portion, and beyond said shoulders being of a diameter to fit said larger bore portion snugly, all in a manner whereby there is an annular chamber in the body member longitudinally defined by said opposed shoulders and peripherally defined by the bore wall of the member and the reduced portion of the stem; the bore of said stem being in communication with the smaller bore portion of the body member whereby gases may be admitted thereto from the exterior of the body member, the supporting member having within it a mixing chamber in communication with its bore, and the stem having ports communicating with said mixing chamber and said annular chamber, a pair of nozzles carried by the supporting member and disposed in its bore at opposite sides of the mixing chamber, one of said nozzles being threadably movable longitudinally through said supporting member bore; said body member having a second bore communicating with and adapted to admit gases from the exterior of the body member to said annular chamber; and a tip carried by said supporting member and with its bore in communication with the supporting member bore.

5. In a torch of the character described, a mixer and a tip, said mixer embodying a body member and a tip supporting member threadably connected thereto said tip being removably connected to the supporting member, said supporting member having a mixing chamber in communication with the tip and to which two gases are adapted to be admitted from the body member at different points, and a removable nozzle adapted to direct gases from said mixing chamber to the tip, said tip and nozzle both being carried directly by said supporting member and being independently removable therefrom.

6. In a torch of the character described, a body member having a bore of two diameters, the bore portion of larger diameter opening to one end of the body member, a tubular tip-supporting member having a tubular stem adapted to be entered in said larger bore portion through said open end, said stem having opposed, longitudinally spaced annular shoulders; the stem, between said shoulders being of lesser diameter than said larger bore portion, and beyond said shoulders being of a diameter to fit said larger bore portion snugly, all in a manner whereby there is an annular chamber in the body member longitudinally defined by said opposed shoulders and peripherally defined by the bore wall of the member and the reduced portion of the stem; the bore of said stem being in communication with the smaller bore portion of the body member whereby gases may be admitted thereto from the exterior of the body member, the supporting member having within it a mixing chamber in communication with its bore, and the stem having ports communicating with said mixing chamber and said annular chamber, a removable nozzle carried directly by the supporting member at the outlet side of the mixing chamber; said body member having a second bore communicating with and adapted to admit gases from the exterior of the body member to said annular chamber; and a tip carried by said supporting member and with its bore in communication with the supporting member bore.

7. In a torch of the character described, a body member having a bore of two diameters, the bore portion of larger diameter opening to one end of the body member, a tubular tip-supporting member having a tubular stem adapted to be entered in said larger bore portion through said open end, said stem having opposed, longitudinally spaced annular shoulders; the stem, between said shoulders being of lesser diameter than said larger bore portion, and beyond said shoulders being of a diameter to fit said larger bore portion snugly, all in a manner whereby there is an annular chamber in the body member longitudinally defined by said opposed shoulders and peripherally defined by the bore wall of the member and the reduced portion of the stem; the bore of said stem being in communication with the smaller bore portion of the body member whereby gases may be admitted thereto from the exterior of the body member, the supporting member having within it a mixing chamber in communication with its bore, and the stem having ports communicating with said mixing chamber and said annular chamber; said body member having a second bore communicating with and adapted to admit gases from the exterior of the body member to said annular chamber; and a detachable tip carried by said supporting member and with its bore in communication with the supporting member bore.

In witness that I claim the foregoing I have hereunto subscribed my name this 1st day of April, 1924.

CARL STROEBEL.